A. LOWMILLER.
Grain-Meter.

No. 221,082. Patented Oct. 28, 1879.

WITNESSES
Sam'l R. Turner
J. B. Holderby

INVENTOR
Alpheus Lowmiller.
By R. S. & A. P. Lacey,
ATTORNEYS.

UNITED STATES PATENT OFFICE.

ALPHEUS LOWMILLER, OF JEWETT, ASSIGNOR TO HIMSELF, JOHN LOW-MILLER, OF SAME PLACE, AND SAMUEL STENGER, OF KILGORE, OHIO.

IMPROVEMENT IN GRAIN-METERS.

Specification forming part of Letters Patent No. 221,082, dated October 28, 1879; application filed April 24, 1879.

*To all whom it may concern:*

Be it known that I, ALPHEUS LOWMILLER, of Jewett, in the county of Harrison and State of Ohio, have invented certain new and useful Improvements in Automatic Grain Weighing and Registering Machines; and I do hereby declare that the following is a full, clear, and exact description of the invention, which will enable others skilled in the art to which it appertains to make and use the same, reference being had to the accompanying drawings, and to letters of reference marked thereon, which form a part of this specification.

This invention has for its object to provide a simple automatic device for weighing grain and registering the amount weighed.

It consists in the peculiar manner of constructing the weighing apparatus, which will be hereinafter fully explained and pointed out in the claim.

Figure 1:
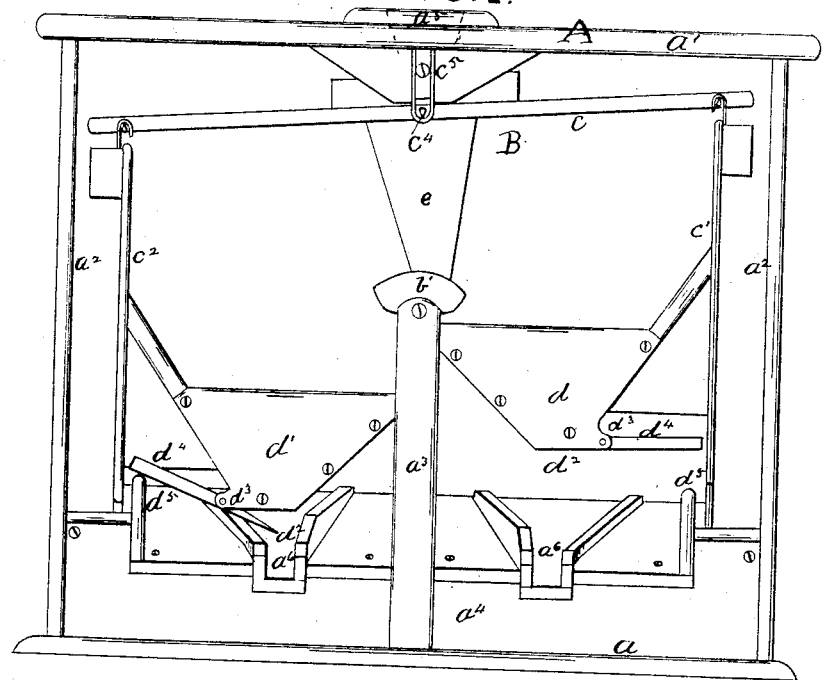
Figure 2:
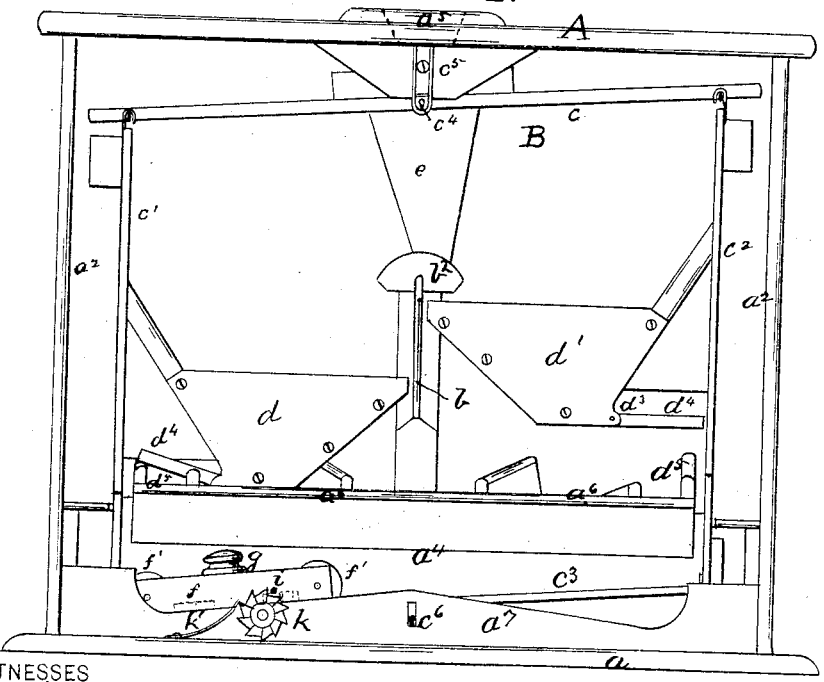

In the drawings, Figure 1 is a front and Fig. 2 a rear side elevation of a device constructed according to my invention.

The frame A, in which the mechanism of my device is supported, is composed of the base $a$, top board $a'$, posts $a^2$ $a^2$, central standard, $a^3$, and skirt-board $a^4$. Through the top board, $a'$, I make a suitable central opening at $a^5$, to which I attach a tube or pipe which extends down through an opening in the top bar of the weighing-frame, for the purpose of conveying the grain to the hoppers. On the skirt-board $a^4$ I affix the chutes $a^6$ $a^6$, which receive the grain from the hoppers, and carry it into suitable spouts or other receptacles.

On the rear side, and at the top of the standard $a^3$, I affix a short vertical partition-board, $b$, on the top of which I place two small guides, $b'$ $b^2$, so arranged as to permit the free play back and forth of the spout, hereinafter described.

The weighing-frame B is composed of the balanced bar $c$, the vertical side bars $c'$ $c^2$, and the guide-bar $c^3$, all suitably connected by joints turning on pivots at their ends, so as to form a parallelogram, as shown.

The bar $c$ is provided with and balanced on knife-edge side-pins $c^4$, supported in hangers $c^5$, attached to the top board $a'$, and the bars $c'$ are hung on knife-edge pins, so that they preserve a vertical position when the frame tilts in the operation of weighing. The lower or guide bar, $c^3$, is also pivoted in like manner as and so that it acts easily and simultaneously with the other bars. The bar $c^3$ is provided at its center with steadying-pins $c^6$, which extend into slots in the skirt-board $a^4$ and the rear side board.

$d$ $d'$ are the hoppers for holding the grain. They are fixed to the side boards $c'$ $c^2$ of the weighing-frame, and are so formed that their inner ends come close to the partition-board $b$, as shown in Fig. 2. They are provided with tilting bottoms $d^2$, pivoted at $d^3$, and extended outward, so that the end $d^4$ will be heavy enough to counterbalance the weight of the grain in the hopper, and so that in the tilting movement of the weighing-frame it will strike a shoulder or stop, $d^5$, projecting upward from the skirt-board $a^4$, and open the bottom of the hopper and discharge the grain into the chutes $a^6$.

$e$ is a spout attached to the top bar, $c$, of the weighing-frame, and extends down close to the top of the partition $b$, and it is so attached and arranged that its lower end oscillates from side to side over the partition $b$, and alternately discharges the grain into the hoppers $d$ $d'$.

$f$ is a small car placed on the bar $c^3$. It is provided with the broad wheels $f'$ $f'$, which run on the top of the bar, and on its under side it has two small wheels pivoted in a horizontal position, so that they run in a slot in the bar and hold the car in place.

The car is provided with a central recess in which I place the weight $g$. The weight of the car remains always the same; but the weight $g$ may be changed for a heavy or lighter one, so that the quantity of grain weighed may be varied. On the side of the car I place a small pin, $i$, so arranged that when the car $f$ runs to the end of bar $c^3$, as shown in Fig. 2, it will engage the registry-wheel $k$, and revolve the latter one cog or tooth. The registry-wheel is so numbered that it indicates the quantity of grain weighed in both hoppers $d$ $d'$. Two registry-wheels could be employed, the other arranged at the opposite end of the frame, so that it will be engaged by the car when the latter runs to the opposite end of the bar $c^3$.

The operation of the device is as follows: The parts being in the position shown in Fig. 2, the grain is received into hopper $d'$. When sufficient grain has been received to slightly overbalance the car $f$ and weight $g$, the weighing-frame will tilt, letting the hopper $d'$ down till its bottom is opened, as shown in Fig. 1, and the grain will be discharged into the chute $a^6$. At the same time the hopper $d$ rises, the spout $e$ swings to the opposite side of partition $b$, and the car $f$, with its weight $g$, runs to the opposite end of bar $c^3$. When hopper $d$ fills with grain a reverse movement takes place, and the car $f$ strikes the wheel $k$ and registers the grain weighed in both hoppers.

Having thus fully described my invention, what I claim is—

The combination, with the frame A and hoppers $d$ $d'$, supported on the vertical swinging bars $c'$ $c^2$, of the bar $c$, balanced on pivots $c^4$, held in bearings on the frame A, and having its ends attached to the upper ends of the bars $c'$ $c^2$ by a hinge or pivotal connecting mechanism, track-bar $c^3$, having its ends attached by a hinge or pivotal connecting device to the lower ends of the vertical bars $c'$ $c^2$, and arranged below the chutes $a^6$, and weighted car $f$, all arranged to operate substantially as and for the purpose set forth.

In testimony that I claim the foregoing as my own I affix my signature in presence of two witnesses.

ALPHEUS LOWMILLER.

Witnesses:
 URIAH SIMMONS,
 JAMES ADAMS.